United States Patent
Fischaber et al.

(10) Patent No.: US 6,925,014 B1
(45) Date of Patent: *Aug. 2, 2005

(54) INTEGRATED CIRCUIT AND METHOD OF READING DATA FROM A MEMORY DEVICE

(75) Inventors: Thomas E. Fischaber, Golden, CO (US); Scott J. Campbell, Frederick, CO (US)

(73) Assignee: Xilinx, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/860,238

(22) Filed: Jun. 2, 2004

Related U.S. Application Data

(63) Continuation-in-part of application No. 10/402,743, filed on Mar. 28, 2003, now Pat. No. 6,847,558.

(51) Int. Cl.[7] .................................................. G11C 7/00
(52) U.S. Cl. .............................. 365/189.01; 365/189.05
(58) Field of Search ...................... 365/189.01, 189.05, 365/189.12, 219, 221

(56) References Cited

U.S. PATENT DOCUMENTS

| 6,519,689 B2 | 2/2003 | Manning |
| 6,603,706 B1 | 8/2003 | Nystuen et al. |

*Primary Examiner*—Vu A. Le
(74) *Attorney, Agent, or Firm*—John King; Kim Kanzaki

(57) ABSTRACT

A blockRAM based FIFO utilizes the blockRAM components to implement a one-cycle latency read FIFO. This FIFO implementation, while utilizing blockRAM, provides fast clock to out times by registering all data in a register prior to presenting it to the user. Because this implementation transparently registers the data, the user interface remains identical to conventional FIFO implementations, while solving the slow clock-to-out time associated with blockRAM based FIFOS. A blockRAM based zero-cycle latency read FIFO is also described.

20 Claims, 5 Drawing Sheets

INTEGRATED CIRCUIT AND METHOD OF READING DATA FROM A MEMORY DEVICE

FIELD OF THE INVENTION

The present invention relates generally to integrated circuits having memory elements, and in particular, to an integrated circuit and method of reading data from a memory device.

BACKGROUND OF THE INVENTION

First-In-First-Out (FIFO) memory queues are useful in numerous applications. They allow the storage and retrieval of data upon user request using a standard read/write interface, as well as crossing between clock domains (in the case of an asynchronous FIFO). FIFOs are typically constructed out of dedicated memory, such as blockRAM (BRAM), in an integrated circuit. However, the blockRAM clock-to-out times are typically on the order of 2.0 ns or larger, even in the fastest speed grades of the newest architectures. This clock-to-out time is five or more times greater that the clock-to-out time of a register, also commonly called a flip-flop, which is approximately 0.5 ns.

In high-speed designs, the slow clock-to-out times of the blockRAM can be a critical path within the design. Therefore, it is common practice to register the output of the blockRAM immediately, prior to performing any operation on the data. While this approach is beneficial, it has significant limitations. Registering the data prior to using it adds an additional cycle of latency to the FIFO.

A block diagram for a conventional FIFO 100 is shown in FIG. 1. In particular, a blockRAM 102 is coupled to write logic 104 and read logic 106. The blockRAM receives a read enable (RdEn) signal and outputs data to a register 108. The read logic 106 outputs a RdDataValid signal to a register 110 and outputs a registered value RdDataValid_r. However, a single read request in the conventional circuit of FIG. 1 takes two clock cycles before the data is available to the user. As shown in FIG. 2, a RdEn requests a read from the FIFO, and RdValid indicates that new data (RdData) is available on the data bus on the following cycle. RdValid_r and RdData_r, which are the registered version of RdValid and RdData, are available to the user two clock cycles following the read request.

This two-cycle latency in reading data is undesirable for a number of reasons. The read enable to the FIFO is most likely a critical path in the design. In addition to the clock-to-out time, the setup time to the blockRAM is also large when compared to normal register setup times. Block-RAM setup for read enable time is approximately 1 ns, while register setup time for read enable is approximately 0.2 ns. If the next read request is dependent upon the data read out of the FIFO, the large clock-to-out and setup requirements severely limits this type of read request. Although one common solution is to always enable the blockRAM for reading, and control the address pointers into the FIFO, there is still a two-cycle latency from read request to registered and valid data.

Zero-cycle latency FIFO memory queues are useful in numerous applications. They allow the storage and retrieval of data the same cycle as it is requested using a standard push/pop interface, as well as crossing between clock domains. Additionally, they provide same cycle turn-around when requesting data, allowing for efficient read throttling based on the contents of the data (i.e. read a data word, investigate the contents, and decide to read again or not at all in a single clock cycle).

Traditionally, zero-cycle latency FIFOs are implemented in asynchronous read RAMs, which can directly provide the data on the same cycle it is requested. However, fully synchronous devices do not support this type of operation. Additionally, if a design is created which allows the blockRAM to be used in a zero-cycle latency manner, the clock-to-out time of the blockRAM are relatively slow (on the order of 2.0 ns or larger) compared to register clock-to-out times (approximately 0.5 ns). The performance of a zero-cycle latency FIFO driven directly from blockRAMs can be limited by the blockRAM clock to out times. A common solution to this problem is to register the output in registers directly following the blockRAM, but this changes the zero-cycle latency FIFO to a one-cycle latency FIFO. This is not desirable if the current data is used to throttle a read for the next cycle.

Accordingly, there is a need for an integrated circuit and method of reading data from a memory device which reduces the clock-to-out time and setup time of a block-RAM.

SUMMARY OF THE INVENTION

A blockRAM based FIFO utilizes the blockRAM components to implement a one-cycle latency read FIFO. This FIFO implementation, while utilizing blockRAM, provides fast clock to out times by registering all data in a register prior to presenting it to the user. Because this implementation transparently registers the data, the user interface remains identical to conventional FIFO implementations, while solving the slow clock-to-out time associated with blockRAM based FIFOs. A blockRAM based zero-cycle latency read FIFO is also described.

A FIFO capable of pre-loading itself with data from the blockRAM, and transparently registering the output data in registers overcomes the problems of prior art devices. The pre-loading FIFO looks exactly like a normal FIFO from the external ports, and therefore, is a drop-in replacement for existing FIFOS. However, the outputs of the FIFO according to embodiments of the present invention are not directly driven from the blockRAM, but instead driven by registers which provide very fast clock-to-out timing. This allows for the user to operate on the data the clock cycle it is valid from the FIFO, without requiring an additional clock cycle of latency.

DETAILED DESCRIPTION OF THE DRAWINGS

Figure 1:
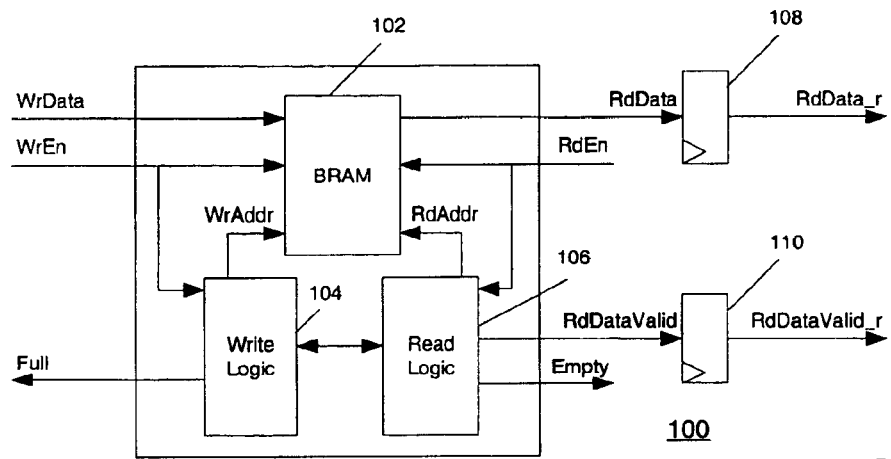
FIG. 1 is a block diagram of conventional circuit for reading data from a memory element.
Figure 2:
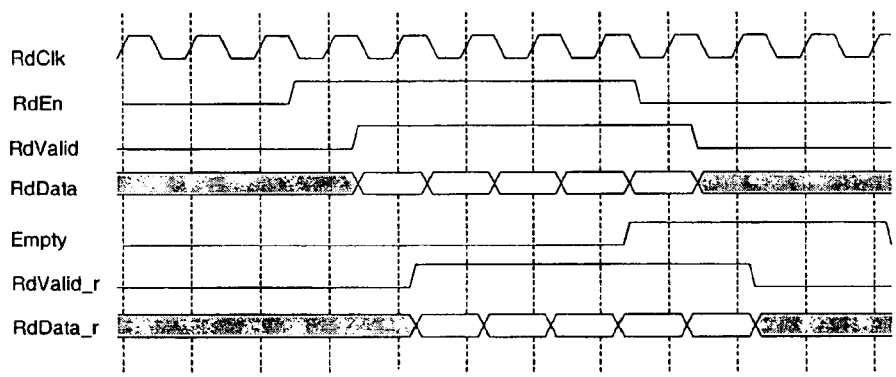
FIG. 2 is a timing diagram showing the operation of the circuit of FIG. 1.
Figure 3:
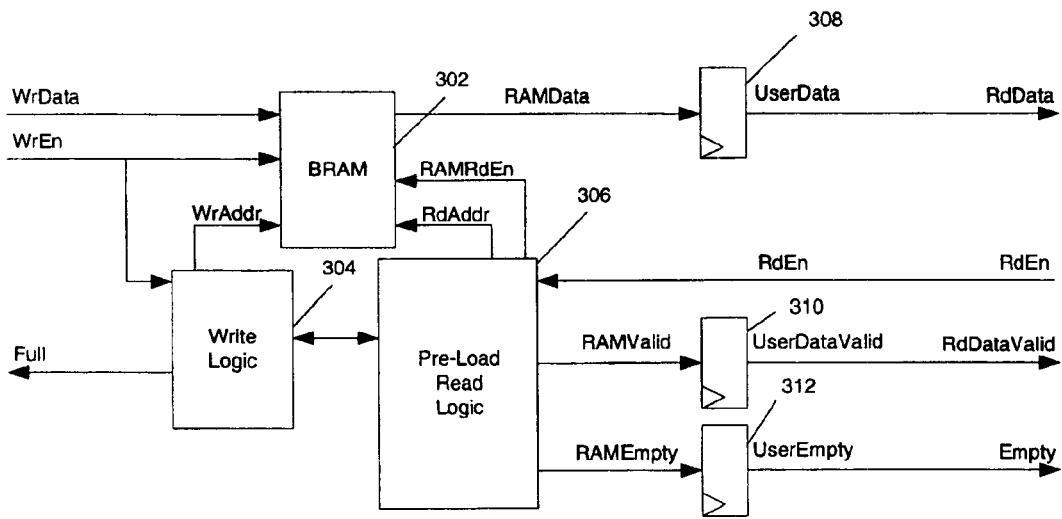
FIG. 3 is a block diagram of a circuit for reading data according to an embodiment of the present invention.
Figure 4:
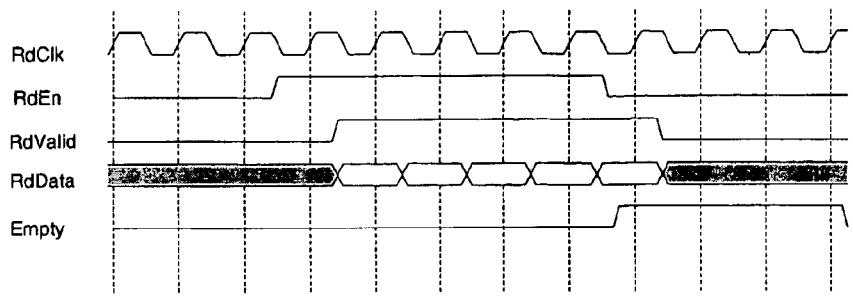
FIG. 4 is a timing diagram showing the operation of the circuit of FIG. 3.

Turning first to FIG. 3, a block diagram of a circuit 300 for reading data according to an embodiment of the present invention having a pre-load FIFO is shown. A memory element such as a blockRAM 302 is coupled to write logic 304 and a pre-load read logic circuit 306 having a read enable (RdEn) signal and outputs data to a register 308. The pre-load read logic circuit couples a RAM valid (RAMValid) signal to a register 310 which outputs a read data valid (RdDataValid) signal. Similarly, a RAM Empty (RAMEmpty) signal is coupled to a register 312, outputting a UserEmpty signal. The user interface (shown as internal ports UserData, UserDatavalid, and UserEmpty and external ports RdData, RdDataValid, and Empty) still retrieves data from the FIFO one clock-cycle after a read is requested on RdEn, but now also provides a clock-to-out time of a register (instead of the blockRAM clock-to-out times). The timing diagram of FIG. 4 shows the operation of the circuit of FIG. 3. As is shown in the timing diagram, data is read from the FIFO on the second clock cycle (i.e. the first clock cycle after the read enable signal).

Figure 5:
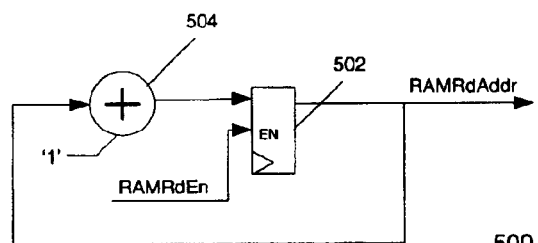
FIG. 5 is a block diagram of a read address generation circuit according to an embodiment of the present invention.

The implementation of the Pre-Load FIFO generally consists of five blocks: read address generation, internal empty generation, internal read enable generation, internal FIFO valid generation, and user signal generation. A block diagram of a read address generation circuit 500 according to an embodiment of the present invention is shown in FIG. 5. The read address is generated similar to typical read address generation. However, the read enable signal coupled to enable a register 502 and controlling the read address is the internal version of the read enable (RAMRdEn). An adder circuit 504 increments the address of the RAM to be read (RAMRdAddr). The generation of the RAMRdEn signal will be described in more detail in reference to FIG. 7.

Figure 6:
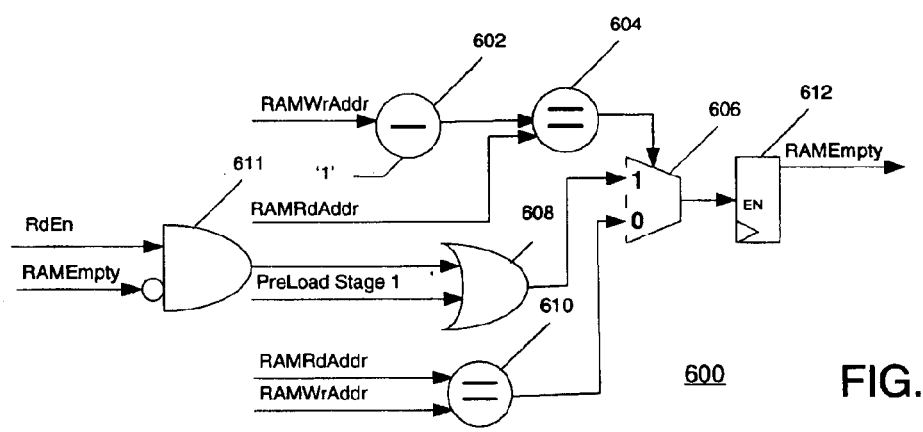
FIG. 6 is a block diagram of a RAM empty generation circuit according to an embodiment of the present invention.

Turning now to FIG. 6 is a block diagram of a RAM empty generation circuit 600 according to an embodiment of the present invention. A traditional FIFO Empty flag is generated when the write address is one ahead of the read address, and a read occurs, or the write address is equal to read address. However, this traditional empty flag generation will no longer work with the Pre-Load FIFO according to an embodiment of the present invention since there are now two different empty flags (i.e. an internal version and an external version). The internal version, RAMEmpty flag shown in FIG. 6, is based on the difference between the read address and the write address. RAMEmpty is asserted true under the following two conditions: 1) the write address is one ahead of the read address, and either the RdEn is selected and the RAM is not empty, or the preload stage 1 (PreLoadStage1) is asserted; or 2) the write address is equal to read address. In particular, a RAMWrAddr is decremented by 1 in a subtraction circuit 602 and compared to a RAMRdAddr in an equal circuit 604, the output of which is coupled to a multiplexer 606. The multiplexer 606 is also coupled to receive the output of an OR gate 608 and an equal circuit 610. The OR gate 608, which is coupled to an AND gate 611, determines whether either the RdEn is selected and the RAM is not empty or the preload stage 1 (PreLoadStage1) is asserted and the equal circuit 610 determines whether the write address is equal to read address.

Figure 7:
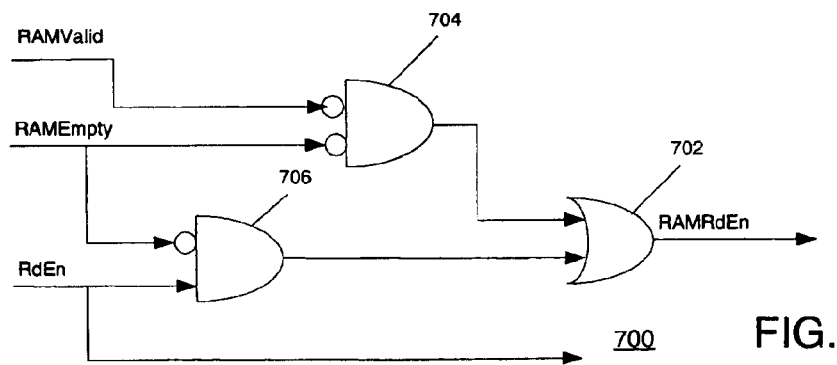
FIG. 7 is a block diagram of a read enable generation circuit according to an embodiment of the present invention.

Turning now to FIG. 7, a block diagram of a read enable generation circuit according to an embodiment of the present invention is shown. While a traditional read enable for a FIFO drives into the logic and blockRAM directly, additional logic is now required to also pre-load the FIFO under certain conditions. The read enable circuit 700 driven by the user (RdEn) is used to create an internal version of the read enable (RAMRdEn) which drives the blockRAM, read address generation, etc. If the user requests a read, or the pre-loaded register, e.g., 308 or 910 is not full and the blockRAM is not empty, then a read should occur. In particular, an OR gate 702 receives the output of an AND gate 704 (which receive RAMValid and RAMEmpty to determine if the pre-load register is not full and the block-RAM is not empty) and 706 (which receives RAMEmpty and RdEn to determine if the blockRAM is not empty and a read has been requested) to generate the RAMRdEn signal.

Figure 8:
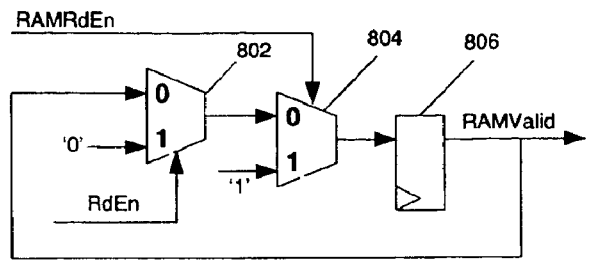
FIG. 8 is a block diagram of a FIFO valid generation circuit according to an embodiment of the present invention.

Turning now to FIG. 8, a block diagram of a FIFO valid generation circuit according to an embodiment of the present invention is shown. While a traditional FIFO does not generate an internal FIFO Valid, the FIFO valid generation circuit 800 for the pre-load FIFO indicates that the pre-load FIFO contains valid data. It is generated using the RdEn from the user coupled to a multiplexer 802, and the internal read enable (RAMRdEn) coupled to a multiplexer 804. If the internal read enable signal (RAMRdEn) is true, then the data on the pre-loaded register, e.g., 308 or 910, is valid (RAMValid is true). If RAMRdEn is not true, then RAMValid is dependent upon the users read request (RdEn). If RdEn is asserted, but the FIFO is empty (since RAMRdEn was false), then RAMValid is false. Otherwise, the last value is held.

Figure 9:
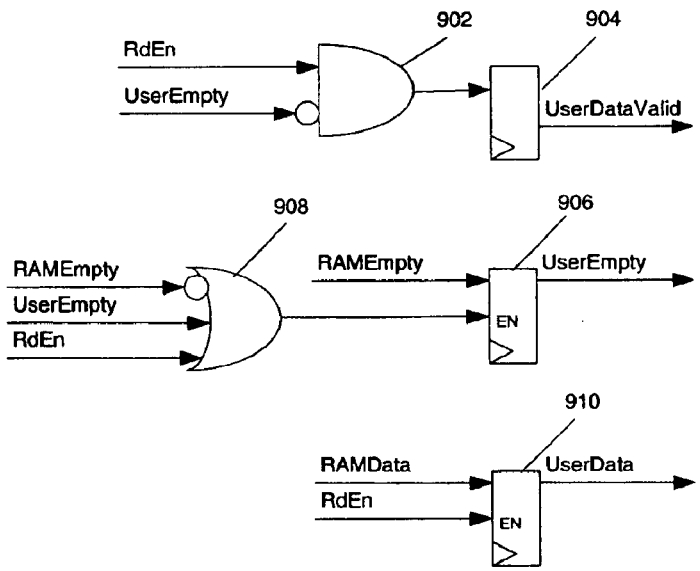
FIG. 9 is a block diagram of a user signal generation circuit according to an embodiment of the present invention.

Turning now to FIG. 9, a block diagram of a user signal generation circuit according to an embodiment of the present invention is shown. As described above, the output of the pre-load FIFO are registered outputs, not driven directly from the blockRAM outputs. In order to emulate the traditional FIFO, the pre-load FIFO signals are generated as follows. A UserDatavalid signal is generated if a RdEn is asserted and FIFO is not empty. In particular, an AND gate 902 receives a RdEn signal and a UserEmpty signal, the output of which is coupled to a register 904. Similarly, a UserEmpty signal is generated when RAMEmpty is not valid, or UserEmpty is true or RdEn is asserted. In particular, RAMEmpty is registered by a register 906 if a false RAMEmpty signal, or UserEmpty or RdEn is coupled to an OR gate 908. Finally, UserData signal is generated when a RdEn is asserted, registering RAMData in a register 910.

Figure 10:
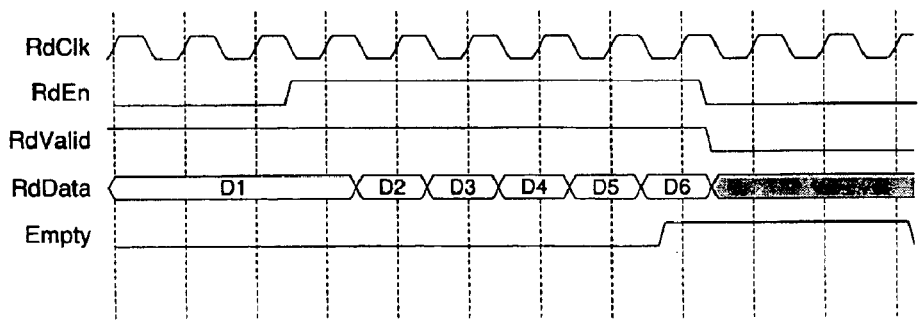
FIG. 10 is a timing diagram showing the operation of an alternate embodiment of the present invention.
Figure 11:
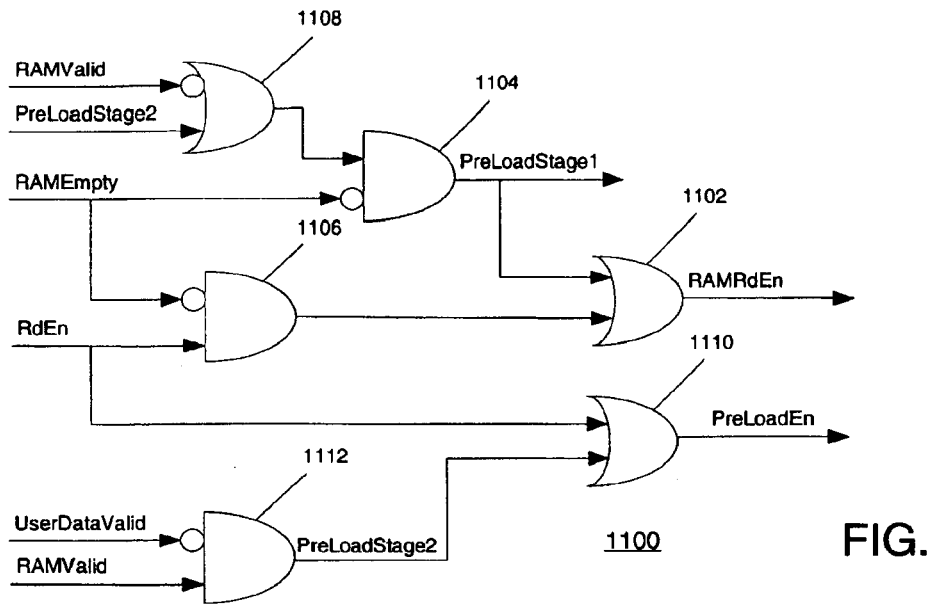
FIG. 11 is a read enable generation circuit according to the alternate embodiment of the present invention.

Turning now to FIG. 10, a timing diagram showing the operation of an alternate embodiment of the present invention enabling same cycle (i.e. zero latency) data reads is shown. The alternate embodiment comprises the same general block diagram as shown in FIG. 3, but comprises different internal read enable generation, internal FIFO valid generation, and user signal generation, which will be described below with respect to FIGS. 11–13. Turning first to FIG. 11, a read enable generation circuit according to an alternate embodiment of the present invention enabling retrieving data on the same clock as a read is shown. The user interface retrieves data from the FIFO on the same clock-cycle a read is requested on RdEn, and also provides a clock-to-out time of a register. The read enable driven by the user (RdEn) is used to create internal versions of the read request. First, RAMRdEn is asserted by way of OR gate 1102 if the user requests a read (RdEn) and the FIFO is not empty (~RAMEmpty) from AND gate 1106, or the FIFO needs to be pre-loaded. A true PreLoadStage1 signal is generated by AND gate 1104 if FIFO is not empty and PreLoadStage2 or ~RAMvalid is output from OR gate 1108. The PreLoadStage1 logic is responsible for placing valid data on the output of the BlockRAM, ready to be sent to the user output on request. PreLoadEn is responsible for placing data onto the user interface, when it is valid. PreLoadEn is output from OR gate 1110 any time the user requests a read, or if PreLoadStage2, generated by AND gate 1112, is valid. Preload Stage 2 is valid when the output data is not valid, but the internal data is valid.

Figure 12:
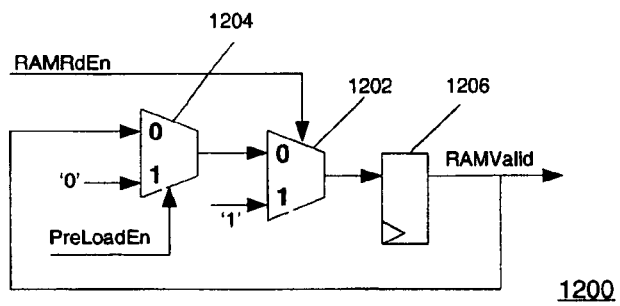
FIG. 12 is FIFO valid generation circuit according to the alternate embodiment of the present invention.

Turning now to FIG. 12, a FIFO valid generation circuit 1200 according to an alternate embodiment of the present invention enabling single-cycle data reads is shown. The FIFO valid generation for the pre-load FIFO indicates that the pre-load FIFO contains valid data. It is generated using the internal read enable (RAMRdEn) and the pre-load output (PreLoadEn) coupled to multiplexers 1202 and 1204, respectively. If the internal read enable signal (RAMRdEn) is true, then the data on the pre-load register 1206 is valid (RAMValid is true). If RAMRdEn is not true, then RAMValid is dependent upon the pre-load requirement. If PreLoadEn is asserted, but the FIFO is empty (since RAMRdEn was false), then RAMValid is false. Otherwise, the last value is held.

Figure 13:
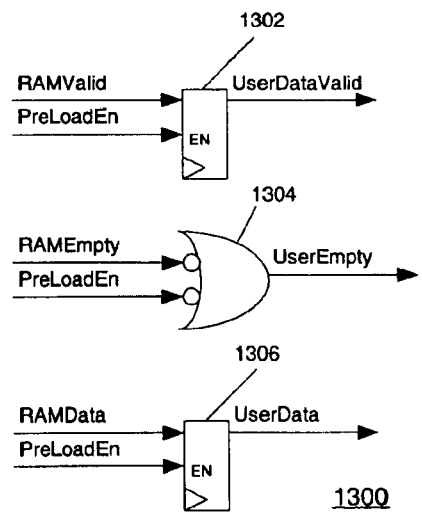
FIG. 13 is a user signal generation circuit according to the alternate embodiment of the present invention.

Turning now to FIG. 13, a user signal generation circuit 1300 according to the alternate embodiment of the present invention enabling same cycle data reads is shown. The pre-load FIFO signals are generated as follows. A UserDataValid is output by register 1302 based upon RAMvalid if enabled by PreLoadEn. UserEmpty is output by OR gate 1304 having the complemtent of RAMEmpty and the complemtent of PreLoadEn as inputs. Finally, UserData is output by register 1306 based upon RAMData if enabled by PreLoadEn. This implementation provides a zero-cycle latency FIFO, while utilizing the dedicated blockRAMs of a device having memory. This allows for large storage and same cycle read access, while also providing fast clock to out times of the data by preloading data in a register.

Figure 14:
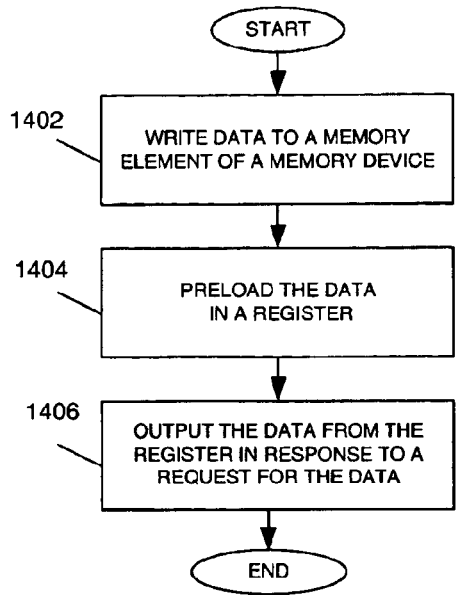
FIG. 14 is a flow chart showing a method of preloading data in a register according to an embodiment of the present invention.

Turning now to FIG. 14, a flow chart shows a method of preloading data in a register according to an embodiment of the present invention. In particular, data is written to a memory element of a memory device at a step 1402. The data is preloaded in a register at a step 1404. The data is then output from the register in response to a request for data at a step 1406.

Figure 15:
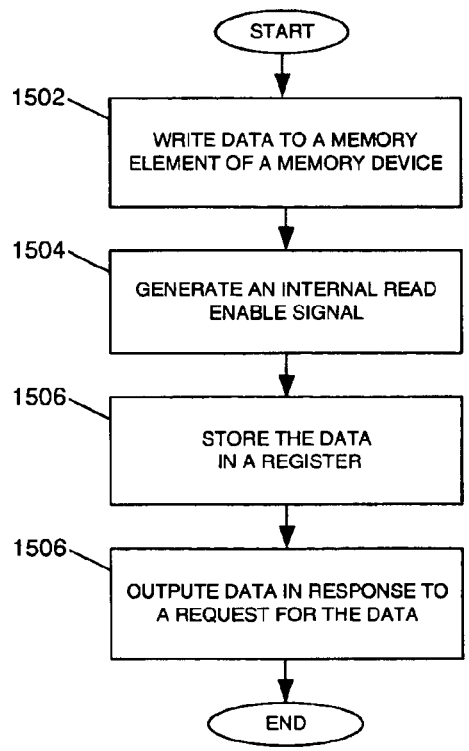
FIG. 15 is a flow chart showing a method of generating an internal read enable signal according to an embodiment of the present invention.

Turning now to FIG. 15, a flow chart shows a method of generating an internal read enable signal according to an embodiment of the present invention. Data is written to a memory element of a memory device at a step 1502. An internal read enable signal is then generated at a step 1504.

Data is then stored in a register at a step 1506. Finally, data is output from the register in response to a request for the data at a step 1508.

Figure 16:
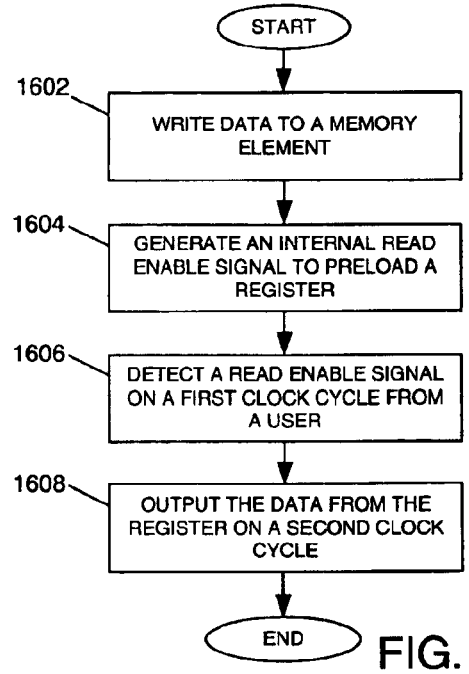
FIG. 16 is a flow chart showing a method of outputting data from memory element having one cycle latency according to an embodiment of the present invention.

Turning now to FIG. 16, a flow chart shows a method of outputting data from memory element having one cycle latency to an embodiment of the present invention. Data is written to a memory element at a step 1602. An internal read enable signal is generated and data is read from the memory element to preload the register at a step 1604. A read enable signal is detected on a first clock cycle at a step 1606. Data from the register is output on a second clock cycle at a step 1608.

Figure 17:
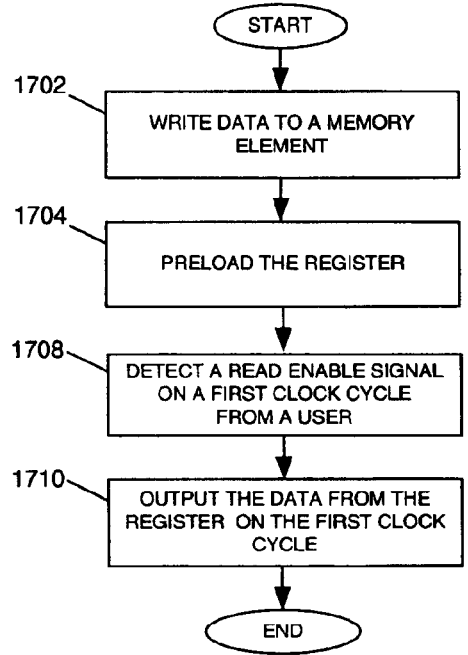
FIG. 17 is a flow chart showing a method of outputting data from a memory element having zero cycle latency to an alternate embodiment of the present invention.

Turning now to FIG. 17, a flow chart shows a method of outputting data from a memory element having zero cycle latency according to an alternate embodiment of the present invention. Data is written to a memory element at a step 1702. Data is then preloaded into a register from the memory element at a step 1704 A read enable signal is detected on a first clock cycle at a step 1708. The data from the register is then output on the first clock cycle at a step 1710.

It can therefore be appreciated that the new and novel integrated circuit and method of reading data from a memory device has been described. It will be appreciated by those skilled inn the art that, particular the teaching herein, numerous alternatives and equivalents will be seen to exist which incorporate the disclosed invention. As a result, the invention is not to be limited by the foregoing embodiments, but only by the following claims.

What is claimed is:

1. A method of reading data from a memory device, said method comprising:

accessing data from a memory element;

preloading said data in a register after said data is accessed from said memory device, when the output data is not valid and the internal data is valid; and outputting said data from said register in response to a request for said data.

2. The method of claim 1 further comprising a step of generating an internal read enable signal.

3. The method of claim 1 further comprising a step of determining if a user is requesting data.

4. The method of claim 1 further comprising a step of generating a preload enable signal.

5. A method of reading data from a memory device, said method comprising:

accessing data from a memory element of said memory device;

storing said data in a register, if said register is not full and said memory element is not empty;

generating an internal read enable signal;

generating a preload enable signal, when the output data is not valid and the internal data is valid; and outputting data from said register in response to a request for said data.

6. The method of claim 5 further comprising a step of preloading said data in said memory element.

7. The method of claim 5 wherein said step of generating an internal read enable signal comprises determining if said register is not full.

8. The method of claim 5 wherein said step of generating an internal read enable signal comprises determining if said memory element is not empty.

9. A method of reading data from a memory device, said method comprising:

accessing data from a memory element;

preloading said data into a register;

detecting a read enable signal on a first clock cycle; and outputting said data from said register during said first clock cycle.

10. The method of claim 9 further comprising a step of generating an internal read enable signal.

11. The method of claim 10 wherein said step of generating an internal read enable signal comprises a step of determining if said register is not full.

12. The method of claim 10 wherein said step of generating an internal read enable signal comprises a step of determining if said memory element is not empty.

13. An integrated circuit incorporating a memory element, said integrated circuit comprising:

a random access memory;

a preload circuit coupled to said random access memory, said preload circuit generating an internal read enable signal and a preload enable signal; and output data generated by said preload circuit.

14. The integrated circuit of claim 13 wherein said preload circuit comprises a register.

15. The integrated circuit of claim 13 further comprising a read enable generator coupled to output said internal read enable signal and said preload enable signal.

16. The integrated circuit of claim 15 further comprising a read address generator coupled to said read enable generator and outputting a read address.

17. The integrated circuit of claim 16 further comprising a RAM empty generator coupled to receive said internal read enable signal and said read address, and output a RAM empty signal.

18. The integrated circuit of claim 13 further comprising a FIFO valid generation circuit coupled to receive said internal read enable signal.

19. The integrated circuit of claim 13 further comprising a user signal generator circuit coupled to receive said preload enable signal.

20. An integrated circuit incorporating a memory element, said integrated circuit comprising:

a random access memory; and a preload circuit coupled to said random access memory, said preload circuit comprising:

a read enable generator outputting an internal read enable signal and a preload enable signal;

a read address generator coupled said read enable generator and outputting a read address;

a RAM empty generator coupled to receive said internal read enable signal and said read address and output a RAM empty signal; and a FIFO valid generation circuit coupled to receive said internal read enable signal.

* * * * *